March 26, 1963 R. C. MASON 3,082,563
FISH HOOKS
Filed July 24, 1961
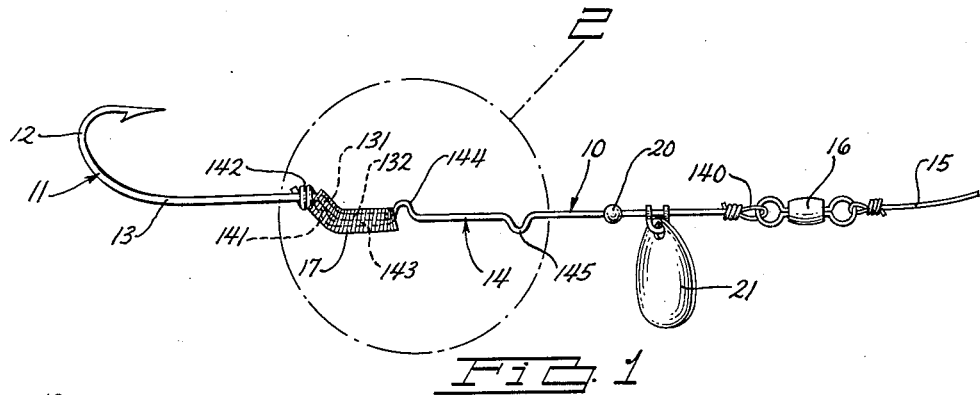
*Fig. 1*
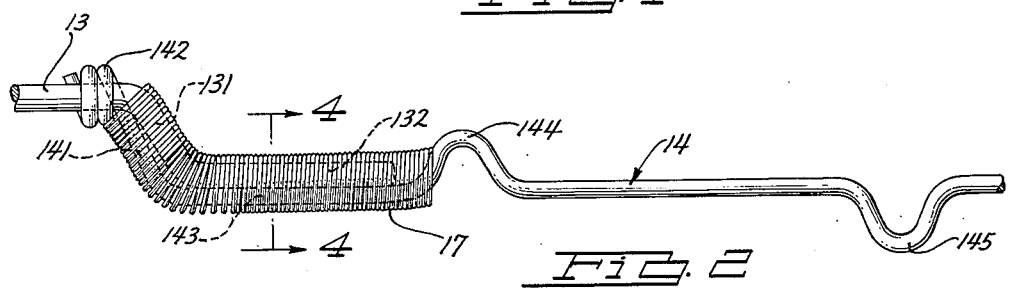
*Fig. 2*
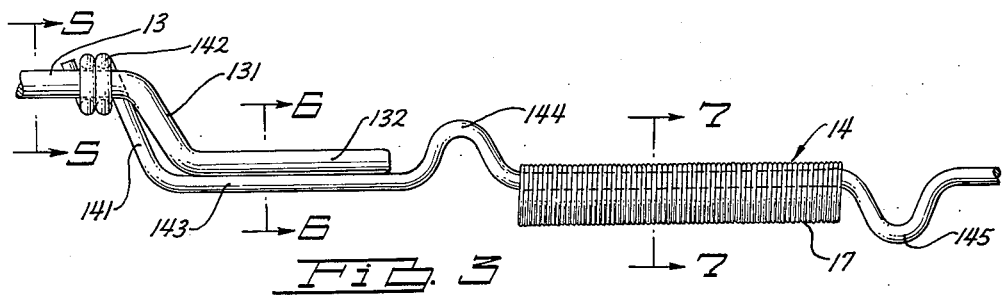
*Fig. 3*
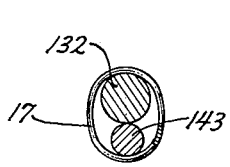 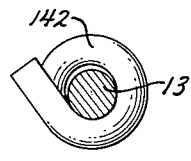 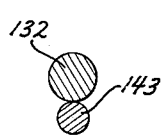 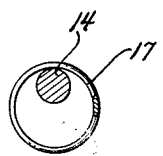
*Fig. 4*    *Fig. 5*    *Fig. 6*    *Fig. 7*
INVENTOR.
ROY CARSON MASON
BY
*Everett W. Wright*
ATTORNEY

United States Patent Office 3,082,563
Patented Mar. 26, 1963

3,082,563
FISH HOOKS
Roy Carson Mason, Cocoa Beach, Fla., assignor of one-half to Floyd E. Taylor, Bloomfield Hills, Mich.
Filed July 24, 1961, Ser. No. 126,021
2 Claims. (Cl. 43—43.16)

This invention relates to improvements in fish hooks, and in particular to a partible fish hook wherein the shank portion may be removed readily from the hook portion to enable the fish hook to be removed easily from clothing, flesh or the like when accidentally snagged thereby.

Accordingly, the primary object of the invention is to provide a two-part fish hook partible at the shank whereby to facilitate removal of the fish hook from an object accidentally snagged thereby without tearing the same, including means for conveniently, readily and firmly securing the parts of the fish hook into an effective whole capable of withstanding the usual stresses placed on a fish hook while landing a fish caught thereby.

Other objects of the invention will become apparent by reference to the following detailed description taken in connection with the accompanying drawing, in which:

FIG. 1 is an elevational view of a fish hook embodying the invention.

FIG. 2 is a greatly enlarged elevational view of that portion of the fish hook disclosed within the dot and dash circle 2 in FIG. 1 more clearly showing the shank joint employed.

FIG. 3 is an elevational view similar to FIG. 2 except that the spring means securing the two parts of the shank of the fish hook together has been telescoped off the shank joint making possible the parting of the shank.

FIG. 4 is an enlarged cross sectional view taken on the line 4—4 of FIG. 2.

FIGS. 5, 6 and 7 are enlarged cross sectional views taken on the lines 5—5, 6—6 and 7—7 of FIG. 3.

Referring now to the drawings wherein like reference characters refer to like and corresponding parts throughout the several views, an illustrative embodiment of a partible fish hook 10 embodying the invention is shown in FIG. 1. The particular fish hook 10 shown for illustrative purposes consists of a hook element 11 including a barbed hook 12 and an integral hook shank 13, an upper shank element 14 including an upper eye 140 which is generally connected to a fish line 15 by means of the usual swivel 16, and a connector or splicing element 17 in the form of a tightly wound strong yet flexible coiled spring which is telescoped over mating ends of the hook shank 13 and the upper shank element 14 as hereinafter described. The hook element 11 is preferably formed of a relatively stiff wire of somewhat larger diameter than the wire of which the upper shank element 14 is formed, the said upper shank element 14 being of a wire equally as strong tensionally as the hook element 11, but relatively flexible.

The upper end of the hook shank 13 of the hook element 11 is offset at 131 and terminates into an offset end portion 132. The lower end of the upper shank is offset at 141 and terminates in an axially disposed preferably two or three turn coil 142, the longitudinal axis through the said coil 142 being parallel to but offset from the longitudinal axis of the upper shank element 14. The offset of the said coil 142 being such as to permit the offset end portion 132 of the hook shank 13 to lie parallel to and juxtaposed above the lower end portion 143 of the upper shank element 14 as shown in FIG. 3 after having telescoped the said coil 142 at the lower end of the upper shank element 14 onto the said hook shank 13. By reference to FIGS. 5 and 6 show the aforesaid relationship of elements in sectional views.

The upper shank element 14 is provided with a relatively smooth curved offset type lower stop 144 located from the coil 142 at the lower end thereof a distance substantially equal to the length of the coiled spring connector element 17. The said upper shank element 14 is provided with a second offset type upper stop 145 located upwardly from the said lower stop 144 a distance slightly greater than the length of the said coiled spring connector element 17. The said coiled spring connector element 17 is shown in its free position in FIG. 3 telescoped onto the upper shank element and stored between the said stops 144 and 145. FIG. 7 shows the aforesaid relationship of elements in a sectional view.

When the hook shank element 13 and the upper shank element 14 are telescoped and juxtaposed as shown in FIG. 3, the coiled spring connector element 17 is manually pushed over and past the lower stop 144 of the upper shank element 14 and onto the offset end portion of the juxtaposed hook shank element 13 adjacent the upper shank element 14 completely filling the longitudinal space between the coil 142 at the lower end of the upper shank element 14 and the lower stop 144 thereof; the said coiled spring connector element 17 removably binding together the said lower shank element 13 and upper shank element 14 including their offset portions 131 and 141, thereby making a strong readily manually releasable connection therebetween, see FIGS. 2 and 4.

It is now quite apparent that should the barbed hook 12 of the hook element 11 become snagged in one's clothing or flesh or in a sail or the like, the barbed hook 12 may be readily removed by parting the two part fish hook 10, and pulling the shank of the hook element 11 through the snagged item, thus avoiding tearing of the clothing or the like, or the painful disgorging of the barbed hook 12 from one's flesh. Also, by parting the hook element 11 from the upper shank element 14, the partible fish hook 10 may be readily disgorged from a fish caught thereby, thereby better preserving the fish for mounting.

That portion of the upper shank element 14 between the upper eye 140 and the uppermost stop 145 is shown in FIG. 1 to have a slidable bead 20 and a slidable and turnable spinner 21 mounted thereon, the said bead 20 preventing the spinner 21 from sliding downwardly on the said upper shank element 14 beyond the uppermost stop 145 formed therein. Obviously, the bead 20 and spinner 21 may be omitted, or, other fish attracting elements may be substituted therefor.

Although but a single embodiment of the invention has been disclosed and described in detail herein, it is obvious that many changes may be made in the size, shape, arrangement and details of the various elements of the invention, all without departing from the spirit and scope thereof as defined by the appended claims.

I claim:

1. A partible fish hook comprising a hook element including an integral hook shank extending therefrom, an upper shank terminating at its upper end into an eye, the lower end of said upper shank having an offset terminating into an axially disposed coil telescopically accommodating said hook shank, said hook shank having an offset and an offset upper end portion telescoped through said coil of said upper shank and disposed adjacent and parallel to said upper shank and the offset thereof, and a flexible coiled spring splicing means telescoped tightly over the upper shank and said adjacent parallel offset upper end portion of said hook shank and the offsets of said upper shank and said hook shank thereby removably locking said hook shank and said upper shank together, an offset stop loop over which said flexible coiled spring splicing means may be forcibly telescoped formed in said upper shank spaced from said offset therein thereby anchoring said coiled spring splicing means in its locking position, the ends of said coiled spring splicing means abutting firmly against said coil of said upper shank and the offset stop loop thereof when said hook shank and said upper shank are removably spliced together thereby.

2. A partible fish hook comprising a hook element including an integral hook shank extending therefrom, an upper shank terminating at its upper end into an eye, the lower end of said upper shank having an offset terminating into an axially disposed coil adapted to neatly telescopically accommodate said hook shank, said hook shank having an offset and an offset upper portion telescoped through said axially disposed coil of said upper shank and disposed adjacent and parallel to said hook upper shank upwardly adjacent the offset thereof, and tightly wound coiled spring splicing means manually removably telescoped over the upper shank and said adjacent parallel offset upper end portion of said hook shank and the off-sets at the lower end of said upper shank and adjacent the upper end of the hook shank, and a loop stop means on said upper shank over which said splicing means may be manually telescoped engaging one end of said coiled spring splicing means and holding the other end thereof firmly in abutment with the axially disposed coil at the lower end of said upper shank.

References Cited in the file of this patent

UNITED STATES PATENTS

| | | |
|---|---|---|
| 2,128,315 | Parker | Aug. 30, 1938 |
| 2,616,208 | Stogermayr | Nov. 4, 1952 |
| 2,871,612 | Mohn | Feb. 3, 1959 |